United States Patent
Okamura et al.

(10) Patent No.: US 8,189,045 B2
(45) Date of Patent: May 29, 2012

(54) SURVEILLANCE CAMERA

(75) Inventors: Shin-Ichiro Okamura, Shijonawate (JP); Jaehyun Lee, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1369 days.

(21) Appl. No.: 11/822,007

(22) Filed: Jun. 29, 2007

(65) Prior Publication Data
US 2008/0002026 A1    Jan. 3, 2008

(30) Foreign Application Priority Data
Jun. 30, 2006  (JP) .................................. 2006-181066

(51) Int. Cl.
*H04N 7/18*   (2006.01)
*H04N 5/225*  (2006.01)
*F21V 35/00*  (2006.01)

(52) U.S. Cl. ...................... 348/143; 348/373; 248/227.2; 248/227.3

(58) Field of Classification Search ............... 348/231.6, 348/211.9, 373, 143–155
See application file for complete search history.

(56) References Cited

U.S. PATENT DOCUMENTS 5,394,209 A * 2/1995 Stiepel et al. ................... 396/20
2007/0126872 A1* 6/2007 Bolotine et al. ............. 348/151

FOREIGN PATENT DOCUMENTS

| JP | 2000-350058 A | 12/2000 |
| JP | 2001-045344 A | 2/2001 |
| JP | 2001-346074 A | 12/2001 |

OTHER PUBLICATIONS

Japanese Office Action dated Apr. 19, 2011, issued in corresponding Japanese Patent Application No. JP2007-168559. w/partial translation.

* cited by examiner

*Primary Examiner* — Joseph Avellino
*Assistant Examiner* — Aftab Nasir Khan
(74) *Attorney, Agent, or Firm* — Westerman, Hattori, Daniels & Adrian, LLP

(57) ABSTRACT

A surveillance camera comprises a base mounted on a wall, an imaging lens mounted on the base via an imaging lens support member and a switchable mounting unit, and a rotation drive device driving the imaging lens so as to rotate in a panning direction. The switchable mounting unit selects either a first posture wherein a seating mount of the base, making contact with the wall, is approximately perpendicular to an axis of panning rotation of the imaging lens or a second posture wherein the seating mount is approximately parallel to the axis of panning rotation, and mounts the imaging lens support member on the base.

3 Claims, 9 Drawing Sheets

FIG. 3
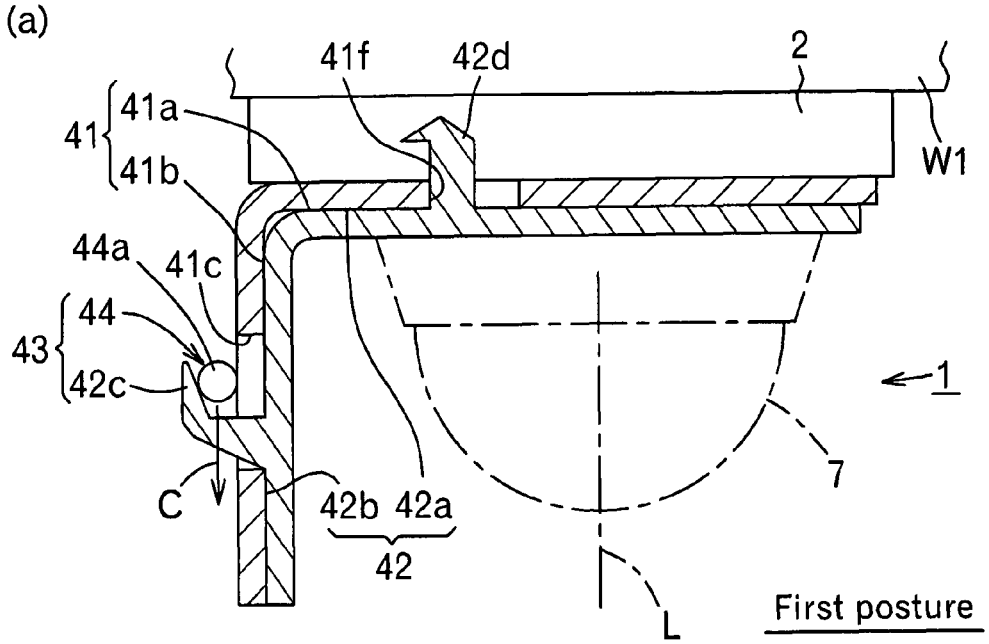
(a) First posture
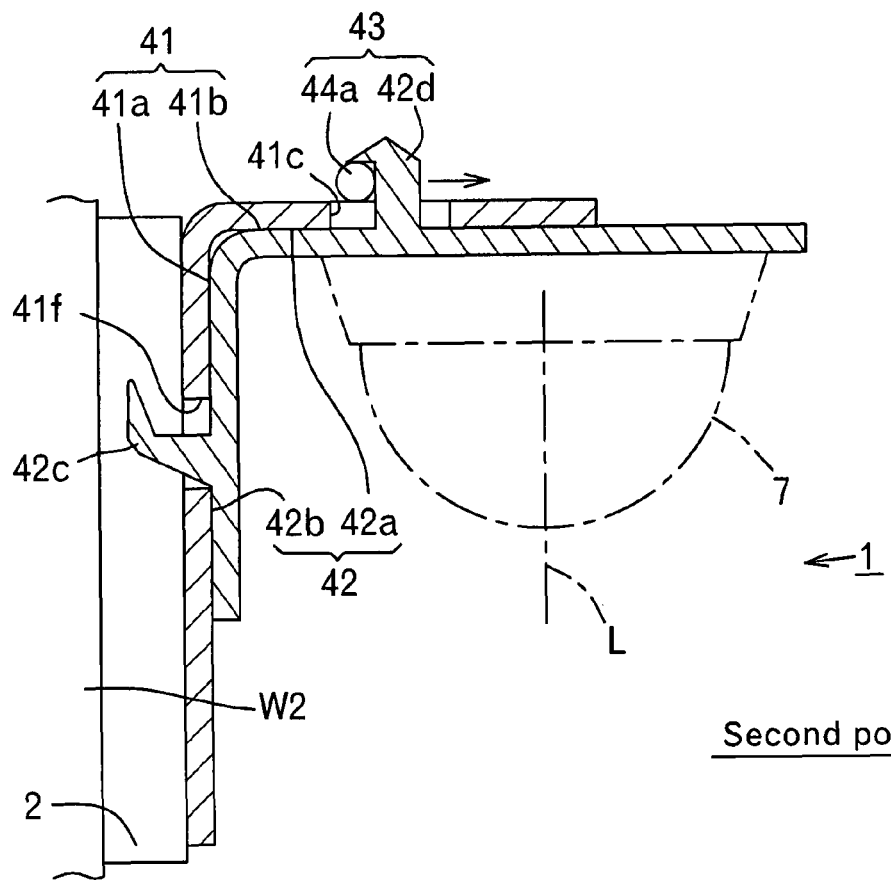
(b) Second posture

SURVEILLANCE CAMERA

BACKGROUND OF THE INVENTION

1. Field of the Invention

The present invention relates to a surveillance camera. In particular, the present invention relates to a surveillance camera capable of correctly displaying the vertical positioning characteristics of a subject on a monitor, regardless of whether the surveillance camera is mounted on a ceiling or a wall.

2. Description of the Related Art

As shown in FIG. 7, a conventional dome-shaped surveillance camera 1 comprises a base 2, an imaging lens 34 supported on the base 2 via a lens support member 3 so as to be capable of rotating in a panning direction shown by Arrow A, a rotation drive device 5 driving the imaging lens 34 so as to rotate in the panning direction, and a controller (not shown) controlling a rotation range of the imaging lens 34. The imaging lens 34 is covered by a transparent cover member 7 and rotates not only in the panning direction of Arrow A but also in a tilting direction shown by Arrow F.

The surveillance camera 1 is generally mounted on a ceiling W1. Accordingly, an axis of panning rotation L of the imaging lens 34 is oriented in a vertical direction, and a subject shot by the imaging lens 34 appears as is on a monitor.

Consequently, if the surveillance camera 1 is mounted directly on a wall W2 as shown in FIG. 8, the axis of panning rotation L of the imaging lens 34 becomes oriented in a horizontal direction, and as a result, an image of a subject as displayed on a monitor has a different orientation to the real orientation thereof. Surveillance is difficult in such a condition.

Accordingly, when the surveillance camera 1 is mounted on the wall W2, a bracket 8 is interposed between the wall W2 and the base 2 of the surveillance camera 1, as shown in FIG. 9. As a result, the mounted orientation of the surveillance camera 1 is the same as that when mounted on the ceiling W1, or in other words, the axis of panning rotation L of the imaging lens 34 is oriented in a vertical direction.

However, when the above-explained conventional surveillance camera 1 is mounted on the wall W2, the cost thereof increases by at least that of the bracket 8. Furthermore, wiring must be passed through the bracket 8, and installation work also becomes more complicated.

SUMMARY OF THE INVENTION

A surveillance camera 1 according to the present invention comprises a base 2 mounted on a wall, an imaging lens 34 mounted on the base 2 via an imaging lens support member 3 and a switchable mounting unit 4, and a rotation drive device 5 driving the imaging lens 34 so as to rotate in a panning direction. The switchable mounting unit 4 selects either a first posture wherein a seating mount 21 of the base 2, making contact with the wall, is approximately perpendicular to an axis of panning rotation L of the imaging lens 34 or a second posture wherein the seating mount 21 is approximately parallel to the axis of panning rotation L, and mounts the imaging lens support member 3 on the base 2.

When the surveillance camera 1 is to be mounted on a ceiling W1, the seating mount 21 of the base 2 is installed so as to be perpendicular to the axis of panning rotation L of the imaging lens 34. When the surveillance camera 1 is to be mounted on a wall W2, the seating mount 21 of the base 2 is installed so as to be parallel to the axis of panning rotation L of the imaging lens 34. As a result, the axis of panning rotation L of the imaging lens 34 is oriented vertically in both cases, and the vertical positioning characteristics of a subject can be correctly displayed as is on a monitor.

BRIEF DESCRIPTION OF THE DRAWINGS

FIG. 3A is a cross-sectional view taken along the plane including line X-X of FIG. 2 and showing a first posture.

FIG. 3B is a cross-sectional view showing a second posture.

DESCRIPTION OF THE PREFERRED EMBODIMENTS

Hereinafter, the preferred embodiment of the present invention will be described with reference to the accompanying drawings.

Figure 1:
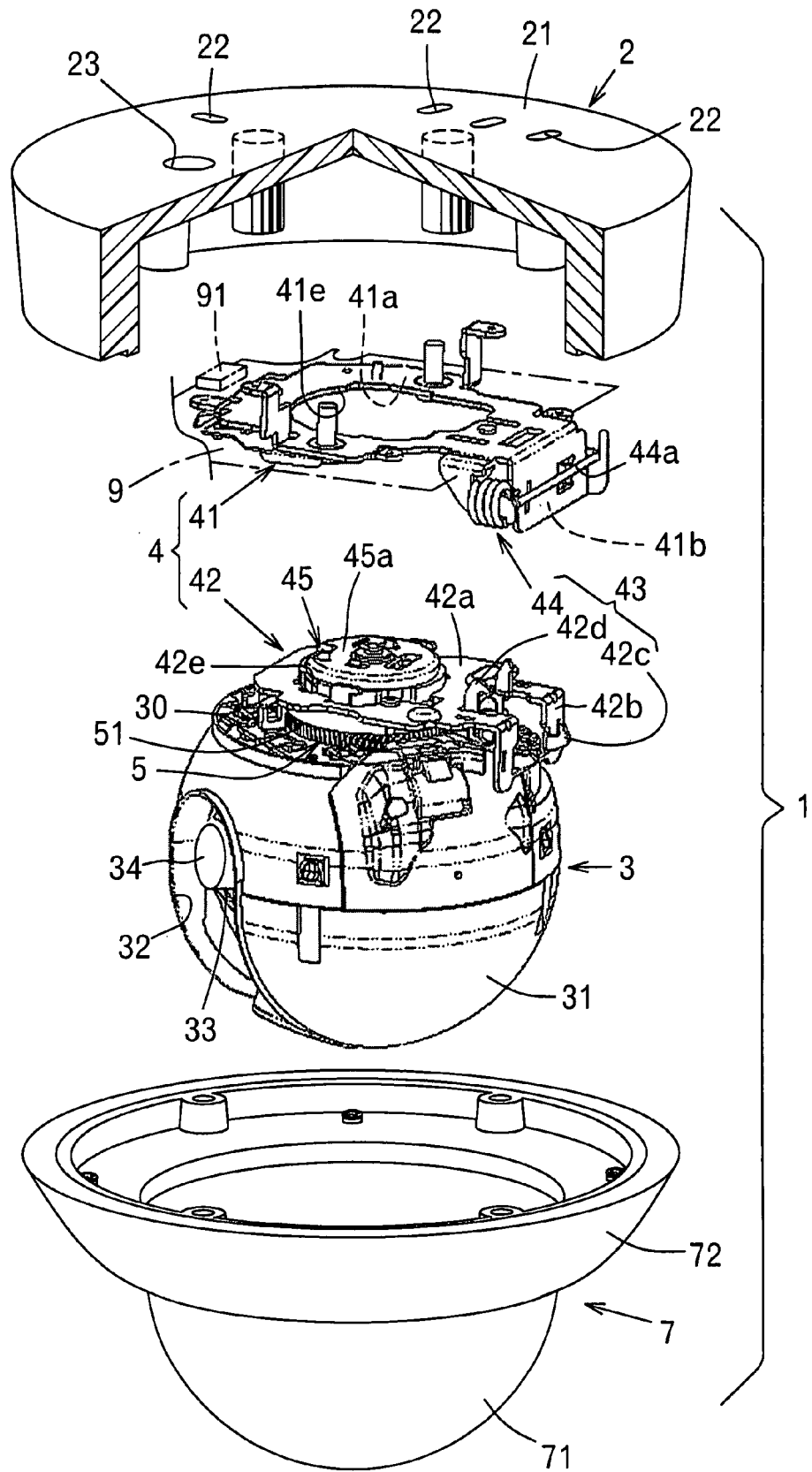
FIG. 1 is an exploded perspective view of a surveillance camera.
Figure 2:
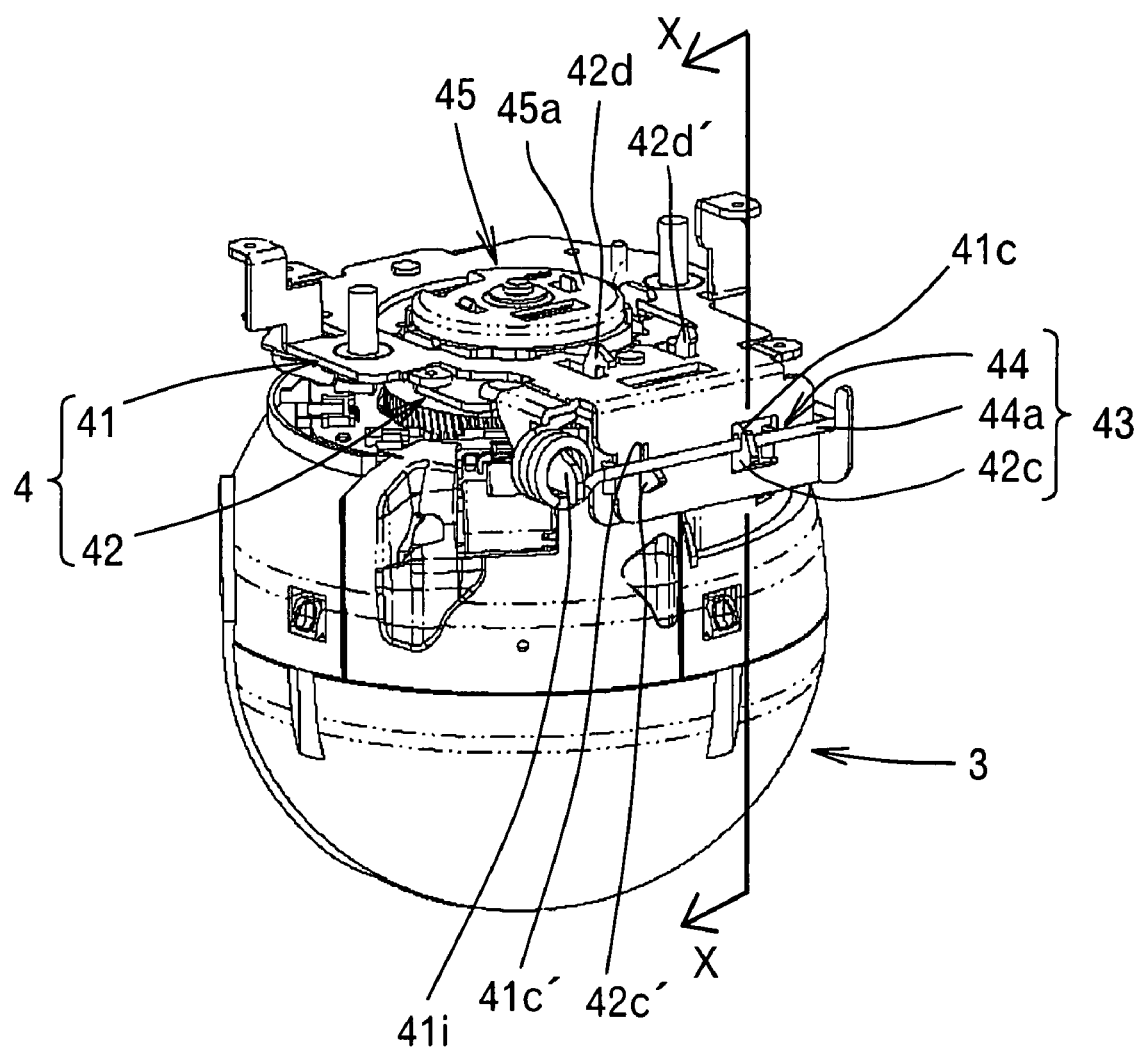
FIG. 2 is a perspective view of an imaging lens support member and a switchable mounting unit.

FIG. 1 is an exploded perspective view showing a dome-shaped surveillance camera 1 of this embodiment, and FIG. 2 is a perspective view of an imaging lens support member 3 and a switchable mounting unit 4, described hereinafter. Similar to a conventional surveillance camera, the surveillance camera 1 comprises a base 2, an imaging lens support member 3, a cover member 7, and a rotation drive device 5 rotating the imaging lens support member 3 in a panning direction. A switchable mounting unit 4 is disposed between the rotation drive device 5 and the base 2, and through an action of the switchable mounting unit 4, a mounting orientation of the imaging lens support member 3 with respect to the base 2 can be selectively changed by approximately 90 degrees.

The switchable mounting unit 4 is a characteristic of this embodiment, and schematic diagrams thereof are shown in FIG. 3A and FIG. 3B. The switchable mounting unit 4 comprises a first positioning plate 41 and a second positioning plate 42, each of which constitutes a metal plate having an L-shaped cross-section, in an aligned and overlapped configuration, and a locking unit 43 securing both of the positioning plates 41, 42 in a condition of mutual contact. The first positioning plate 41 is disposed on the side of the base 2, and the second positioning plate 42 is disposed on the side of the imaging lens support member 3.

The first positioning plate 41 comprises a mutually-perpendicular first contact surface 41a and second contact surface 41b. The second positioning plate 42 comprises a mutually-perpendicular first contact surface 42a and second contact surface 42b.

When the surveillance camera 1 is mounted on a ceiling W1, the base 2 is secured to the ceiling W1, and a state of the switchable mounting unit 4 and the imaging lens support member 3 at this time is referred to as the first posture. When the surveillance camera 1 is mounted on a wall W2, the base 2 is secured to the wall W2, and a state of the switchable mounting unit 4 and the imaging lens support member 3 at this time is referred to as the second posture. Either the first posture or the second posture is selected so that the surveillance camera 1 can be mounted on the ceiling W1 or the wall W2. In the first posture, and the second posture, the orientation of the second positioning plate 42 is the same and the orientation of the first positioning plate 41 differs by approximately 90 degrees. In both postures, the first contact surface 41a of the first positioning plate 41 opposes the base 2, and the imaging lens support member 3 is mounted on the first contact surface 42a of the second positioning plate 42. Hereinafter, the entire surveillance camera 1 is described.

Base, Cover, and Imaging Lens Support Member

The base 2 shown in FIG. 1 is provided with a seating mount 21 making contact with a wall, and a plurality of small holes 22 through which screws (not shown) for securing to the ceiling W1 or wall W2 pass are formed in the seating mount 21. In addition, a wire extraction hole 23 is also formed.

A cover 7 comprises a spherical transparent cover 71 and an annular mounting seat 72 passing fully around an opening section of the transparent cover 71, and the mounting seat 72 is secured to the base 2 using a screw or the like.

The imaging lens support member 3 comprises a hollow, approximately spherical shell body 31, a lens barrel 33 disposed inside the shell body 31 and having an imaging lens 34, and a support member (not shown) supporting the lens barrel 33 so as to be capable of rotating in a tilting direction. A tilting-direction rotation drive device (not shown) is connected to the lens barrel 33.

An approximately circular opening 30 is formed in a top surface of the shell body 31, and the panning-direction rotation drive device 5 of the imaging lens 34 is disposed in the opening 30. A tilt-use aperture 32 is formed from a lower end portion of the shell body 31 towards the opening 30. A tip of the lens barrel 33 protrudes from the aperture 32.

The rotation drive device 5 has an annular bevel wheel 51 fitted so as to be capable of rotating freely to a thick, short shaft section 45a of a seat section 45 protruding from the opening 30 to an outer side. A worm gear (not shown) mounted on the shell body 31 meshes with a row of beveled gear teeth formed on an outer surface of the bevel wheel 51, and a motor (not shown) is connected to the worm gear.

Switchable Mounting Unit

The bevel wheel 51 is mounted on the base 2 via the switchable mounting unit 4. The first positioning plate 41 of the switchable mounting unit 4 has the first contact surface 41a and second contact surface 41b as inner surfaces thereof. The second positioning plate 42 has the first contact surface 42a and second contact surface 42b as outer surfaces thereof. With regard to both the first positioning plate 41 and the second positioning plate 42, the first contact surfaces 41a, 42a are larger than the second contact surfaces 41b, 42b, and each of the first contact surfaces 41a, 42a has an opening section 41e, 42e wherein the shaft section 45a on the imaging lens support member 3 fits with a little leeway.

Figure 4:
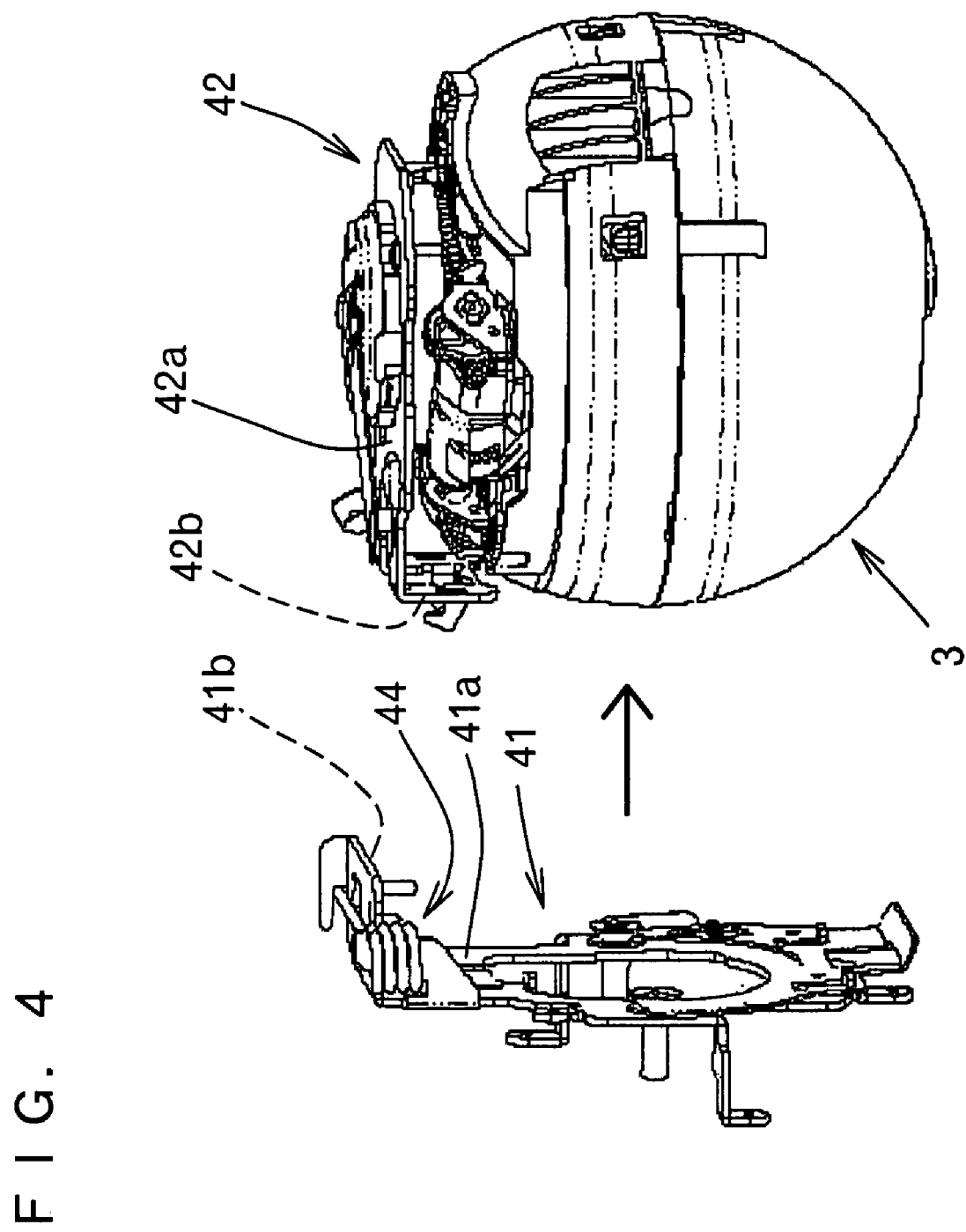
FIG. 4 is a perspective view showing a first positioning plate brought into contact with a second positioning plate in the second posture.
Figure 5:
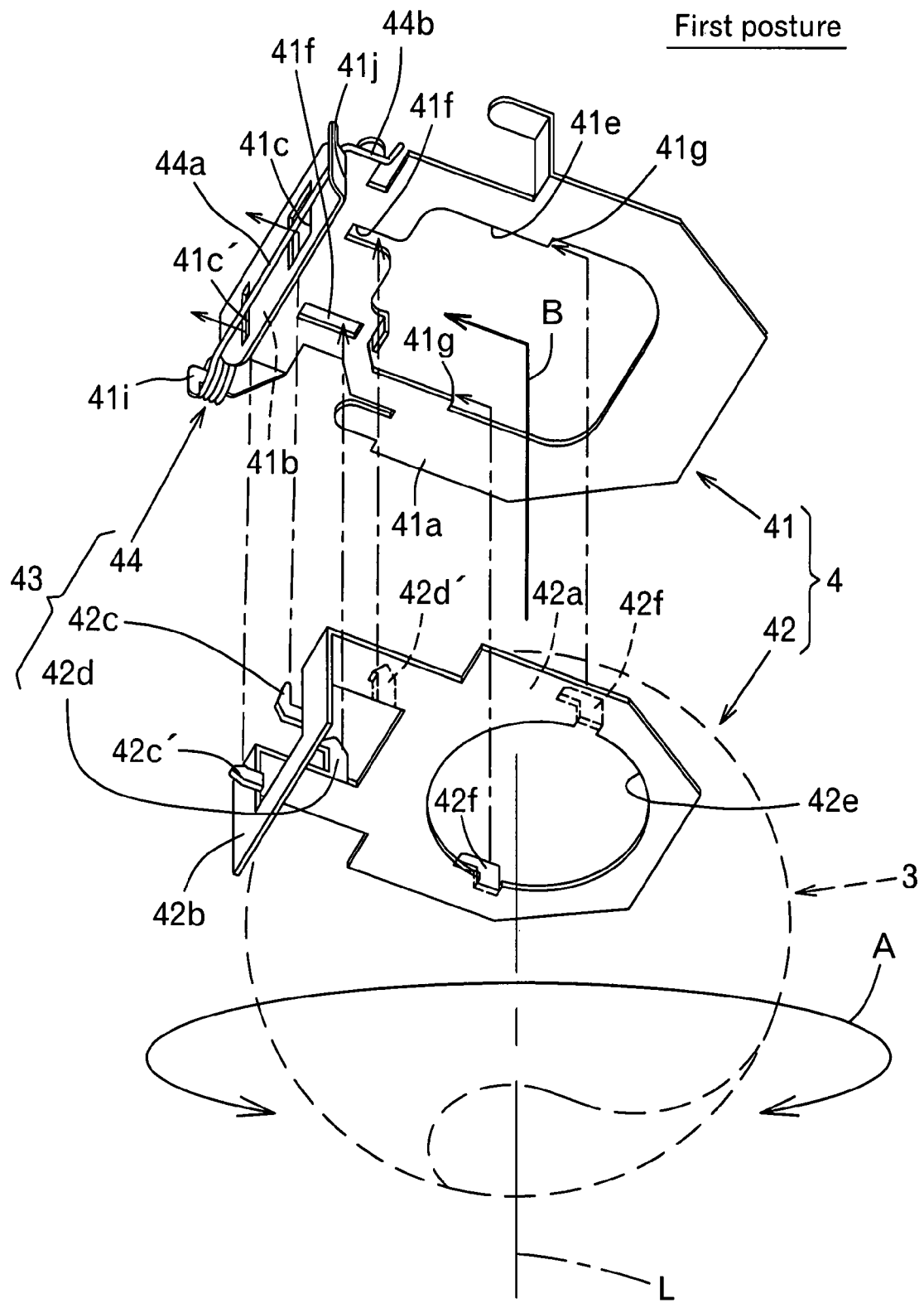
FIG. 5 is an inclined upward perspective view of the second positioning plate making contact with the first positioning plate, disposed in parallel with a ceiling.
Figure 6:
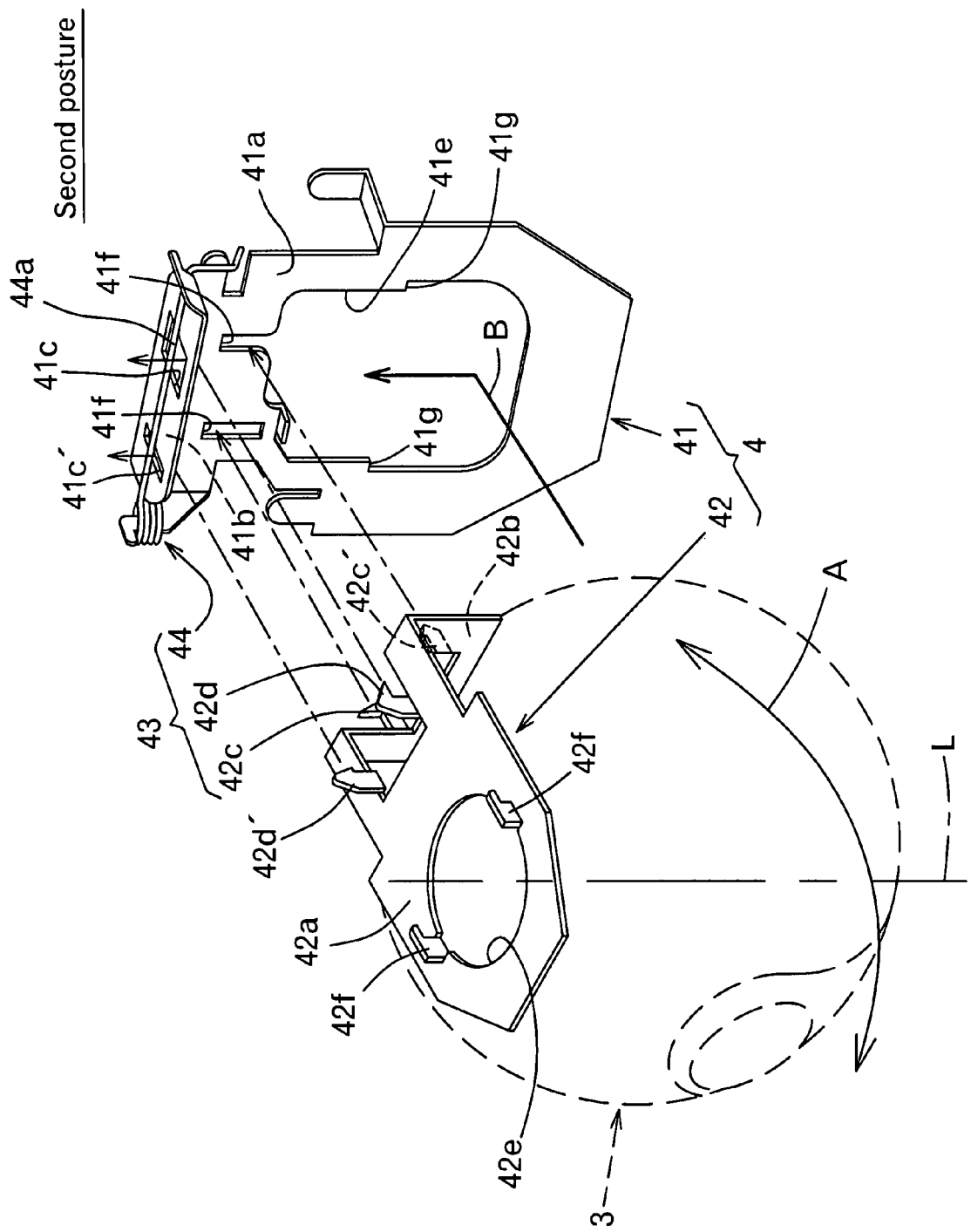
FIG. 6 is an inclined downward perspective view of the second positioning plate making contact with the first positioning plate, disposed in parallel with a wall.
Figure 7:
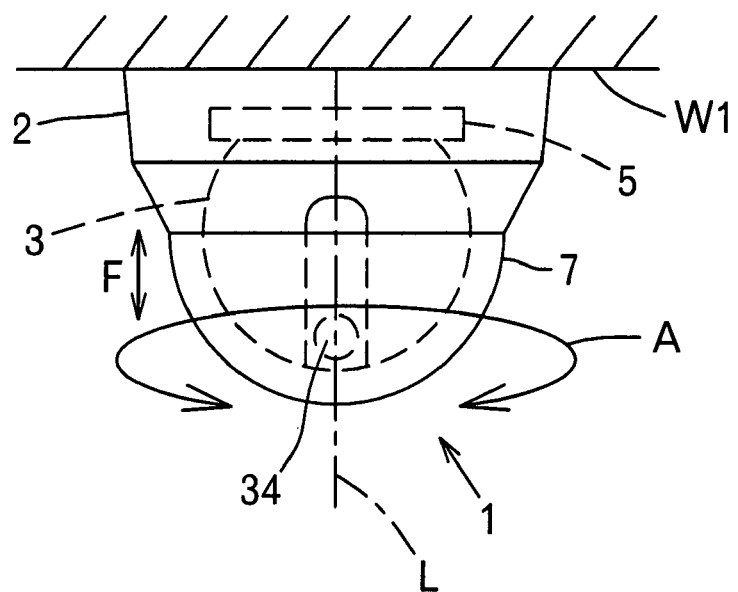
FIG. 7 is an explanatory diagram of a conventional surveillance camera mounted on a ceiling.
Figure 8:
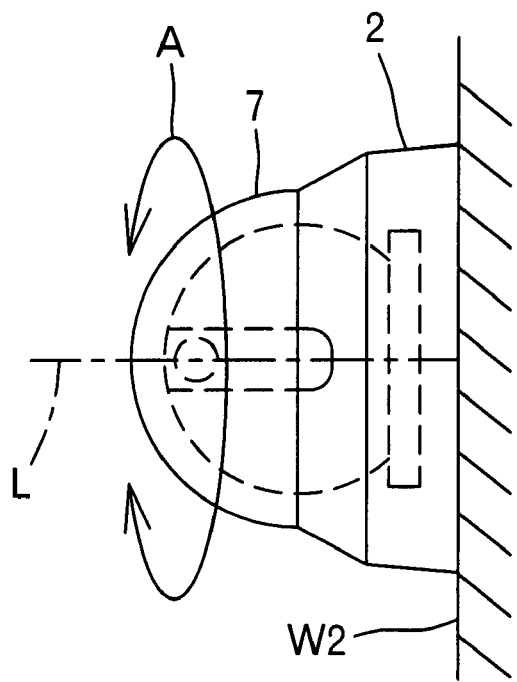
FIG. 8 is an explanatory diagram of a conventional surveillance camera mounted directly on a wall.
Figure 9:
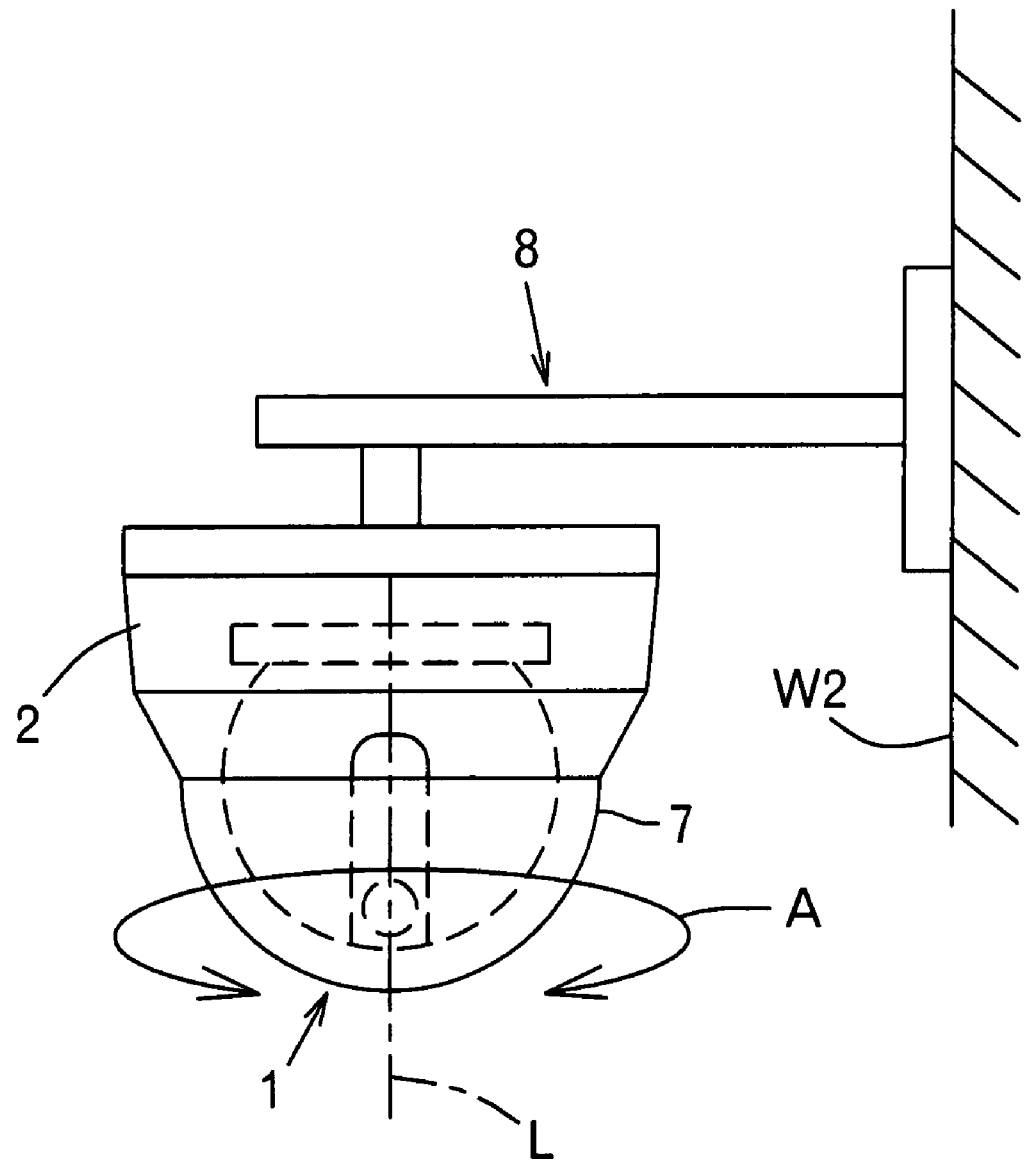
FIG. 9 is an explanatory diagram of a conventional surveillance camera mounted on a wall via a bracket.

FIG. 4 is a perspective view showing the first positioning plate 41 brought into contact with the second positioning plate 42 in the second posture. FIG. 5 is an inclined upward view of the second positioning plate 42 making contact with the first positioning plate 41, disposed in parallel with a wall. FIG. 6 is an inclined downward perspective view of the first positioning plate 41, disposed in parallel with a ceiling.

In FIG. 5 and FIG. 6, Arrow A shows a direction of panning rotation, and Arrow B shows a direction of motion for assembly of the second positioning plate 42 to the first positioning plate 41.

The first positioning plate 41 is detachably secured to the inside of the base 2 in such a way that the first contact surface 41a is parallel to the seating mount 21 of the base 2 and the second contact surface 41b is approximately perpendicular to the seating mount 21. An orientation of the first positioning plate 41 with respect to the base 2 is invariable.

The second positioning plate 42 is fitted together with the shaft section 45a on the imaging lens support member 3 and secured to the bevel wheel 51 using a screw or the like.

In the first posture, the imaging lens support member 3 is oriented such that the first contact surface 41a of the first positioning plate 41 makes contact with the first contact surface 42a of the second positioning plate 42, and the second contact surface 41b of the first positioning plate 41 makes contact with the second contact surface 42b of the second positioning plate 42. The opening sections 41e, 42e mutually overlap.

In the second posture, the first contact surface 41a of the first positioning plate 41 makes contact with the second contact surface 42b of the second positioning plate 42, and the second contact surface 41b of the first positioning plate 41 makes contact with the first contact surface 42a of the second positioning plate 42.

In both the first posture and second posture, the approximately spherical imaging lens support member 3 is capable of rotation.

The first positioning plate 41 and the second positioning plate 42 are provided with a locking unit 43 for locking the condition of contact of the positioning plates 41, 42 in the first posture or the second posture. The second positioning plate 42 is provided with a main claw 42c and an auxiliary claw 42d.

The locking unit 43 comprises a hole 41c formed in the first positioning plate 41 and wherethrough the main claw 42c or the auxiliary claw 42d is selectively passed in accordance with selection between the first posture and the second posture, and a torsion spring 44 being an elastic member preventing extraction of the main claw 42c or the auxiliary claw 42d from the hole 41c.

The main claw 42c and the auxiliary claw 42d are each formed by cutting and raising from the second positioning plate 42, and as shown in FIG. 5 and FIG. 6, the main claw 42c protrudes from the second contact surface 42b in an outward direction, and the auxiliary claw 42d protrudes from the first contact surface 42a in an outward direction.

A tip of both the main claw 42c and the auxiliary claw 42d is curved so as to form a hook shape. A positioning claw 42c' is provided on the second contact surface 42b of the second positioning plate 42 so as to form a pair with the main claw 42c, and a positioning claw 42d' is provided on the first contact surface 42a of the second positioning plate 42 so as to form a pair with the auxiliary claw 42d.

Furthermore, two hooking claws 42f, 42f on the first contact surface 42a protrude from the opening section 42e in an outward direction.

The second contact surface 41b of the first positioning plate 41 is provided with the hole 41c wherethrough the main claw 42c or the auxiliary claw 42d on the second positioning plate 42 can pass from inside to outside with leeway. The second contact surface 41b is provided with a slit 41c' aligned laterally with the hole 41c and wherethrough the positioning claw 42c' or the positioning claw 42d' passes from inside to outside with almost no leeway.

The first contact surface 41a of the first positioning plate 41 is provided with escape notches 41f, 41f connected to the opening section 41e. As shown in FIG. 5, when the main claw 42c and the positioning claw 42c' of the second positioning plate 42 fit into the hole 41c and the slit 41c' of the first positioning plate 41 in the first posture, the auxiliary claw 42d and the positioning claw 42d' of the second positioning plate 42 avoid contact via the escape notches 41f, 41f. That is to say, the escape notches 41f, 41f prevent the auxiliary claw 42d and the positioning claw 42d' from interfering with the first contact surface 41a.

As shown in FIG. 6, when the auxiliary claw 42d and the positioning claw 42d' on the second positioning plate 42 fit into the hole 41c and the slit 41c' of the first positioning plate 41 in the second posture, the main claw 42c and the positioning claw 42c' on the second contact surface 42b of the second positioning plate 42 avoid contact via the escape notches 41f, 41f. That is to say, the escape notches 41f, 41f also serve to prevent the main claw 42c and the positioning claw 42c' from interfering with the first contact surface 41a.

As shown in FIG. 5 and FIG. 6, the opening section 41e of the first positioning plate 41 is provided with two receiver sections 41g, 41g hooked by the hooking claws 42f, 42f on the second positioning plate 42 when the second positioning plate 42 is correctly making contact with the first positioning plate 41.

As shown in FIG. 5, the torsion spring 44 is fitted at a center portion thereof onto a support piece 41i extending from the first positioning plate 41 and mounted in the vicinity of an end portion of the second contact surface 41b on the side of the slit 41c'. A free-end portion 44a of the torsion spring 44 extends straight along an outer surface of the second contact surface 41b so as to pass the slit 41c' and the hole 41c. The free-end portion 44a engages with a hooking piece 41j on the first positioning plate 41 and is formed so as to have an operation piece 44b curved further inwards.

When the main claw 42c of the second positioning plate 42 passes through the hole 41c of the first positioning plate 41 in the first posture shown in FIG. 5, the free-end portion 44a of the torsion spring 44 engages with the main claw 42c and exerts an elastic force (in a direction of Arrow C of FIG. 3A).

In this embodiment, as shown in FIG. 3A, a portion of the main claw 42c making contact with the torsion spring 44 is formed with a tapered surface such that the free-end portion 44a becomes wedged. In this way, looseness when the first positioning plate 41 and the second positioning plate 42 are making contact can be eliminated.

In the same way as the main claw 42c, a portion of the auxiliary claw 42d making contact with the free-end portion 44a is formed with a tapered surface such that the free-end portion 44a becomes wedged.

As shown in FIG. 1, a wiring board 9 is mounted on an opposite surface (upper surface in FIG. 1) of the first positioning plate 41 to the first contact surface 41a. A power source circuit 91 providing power to the panning-direction rotation drive device 5 is provided on the wiring board 9.

When the Surveillance Camera is Mounted on the Ceiling W1;

If the surveillance camera 1 is to be mounted on the ceiling W1, the base 2 is secured to the ceiling W1.

As shown in FIG. 2, the first positioning plate 41 is secured to the second positioning plate 42, mounted on the lens support member 3, such that the first contact surfaces 41a, 42a make mutual contact and the second contact surfaces 41b, 42b make mutual contact.

At this time, the main claw 42c and the positioning claw 42c' on the second contact surface 42b of the second positioning plate 42 is required to engage with the hole 41c and the slit 41c' of the first positioning plate 41, respectively. In this case, the operation piece 44b of the torsion spring 44 is pushed manually in the opposite direction to the urging direction of the torsion spring 44 (that is, the opposite direction to that of Arrow C of FIG. 3A). The free-end portion 44a of the torsion spring 44 moves away from the hole 41c and the slit 41c', and the main claw 42c and the positioning claw 42c' are permitted to pass through the hole 41c and the slit 41c'. When the manual pressing of the operation piece 44b of the torsion spring 44 is released, the free-end portion 44a of the torsion spring 44 becomes wedged against the main claw 42c, and the first positioning plate 41 and the second positioning plate 42 can be locked together.

In addition, the locked condition can be easily released by pressing the operation piece 44b of the torsion spring 44.

The first positioning plate 41 is mounted at a prescribed position on the base 2, and the dome-shaped transparent cover 7 is placed over the lens support member 3 and mounted on the base 2.

The above-explained steps make it possible for the surveillance camera 1 to be mounted in the first posture with the axis of panning rotation L of the imaging lens 34 perpendicular to the seating mount 21 of the base 2 and the ceiling W1.

When the Surveillance Camera is Mounted on the Wall W2;

If the surveillance camera 1 is to be mounted on the wall W2, the base 2 is secured to the wall W2.

As shown in FIG. 4, the first positioning plate 41 is mounted on the second positioning plate 42, mounted on the lens support member 3. The first positioning plate 41 is secured such that the first contact surface 41a makes contact with the second contact surface 42b and the second contact surface 41b makes contact with the first contact surface 42a.

At this time, the auxiliary claw 42d and the positioning claw 42d' on the first contact surface 42a of the second positioning plate 42 is required to engage with the hole 41c and the slit 41c' of the first positioning plate 41, respectively. In this case, in the same way as explained above, the operation piece 44b of the torsion spring 44 is pushed manually and the first positioning plate 41 and the second positioning plate 42 are locked together.

The first positioning plate 41 is mounted at a prescribed position on the base 2, and the dome-shaped transparent cover 7 is placed over the lens support member 3 and mounted on the base 2.

The above-explained steps make it possible for the surveillance camera 1 to be mounted in a second posture with the axis of panning rotation L of the imaging lens 34 oriented downward and approximately parallel to the seating mount 21 of the base 2 and the wall W2.

As explained above, the surveillance camera 1 can be mounted on either the ceiling W1 or the wall W2 with the axis of panning rotation L of the imaging lens 34 oriented downward, and consequently, the vertical positioning characteristics of a subject can be correctly displayed as is on a monitor.

The locking unit for locking the condition of mutual contact between the first positioning plate 41 and the second positioning plate 42 is not limited to the above-explained embodiment. Other configurations such as screw fixing of the first positioning plate 41 and the second positioning plate 42 can be employed.

In the locking unit 43 of this embodiment, the tips of the positioning claws 42c', 42d' can also be curved so as to wedge the free-end portion 44a of the torsion spring 44.

Furthermore, as another embodiment, a hole 41c and a slit 41c' can be provided on a second positioning plate 42, and a main claw 42c and a positioning claw 42c', and an auxiliary claw 42d and a positioning claw 42d', selectively engageable with the hole 41c and the slit 41c', can be extended from a first positioning plate 41. A torsion spring 44 operating as explained above can be provided on the second positioning plate 42 so as to form a locking unit for securing the first positioning plate 41 and the second positioning plate 42.

Figure 10:
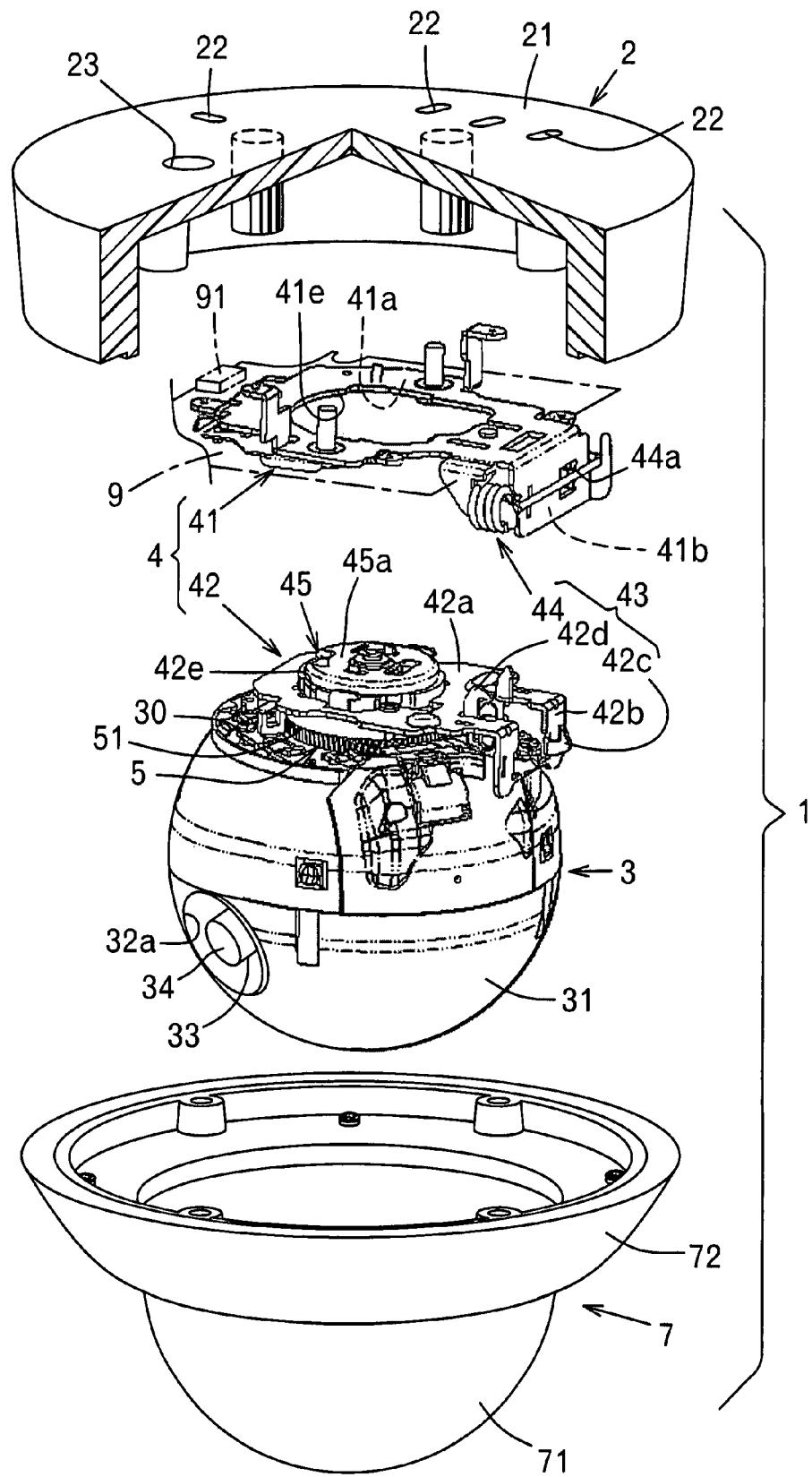
FIG. 10 is an exploded perspective view of another surveillance camera.

Furthermore, FIG. 10 is an exploded perspective view of another surveillance camera 1. In FIG. 10, the imaging lens 34 is fitted in a hole 32a and does not move along the hole 32a. The afore-mentioned switchable mounting unit 4 is applicable to the surveillance camera 1. In this case, the seat mount 21 of the base 2 is approximately horizontal (lying) in the first posture, and is approximately vertical (longitudinal) in the second posture. An imaging direction of the imaging lens 34 is substantially same between the both postures.

What is claimed is:

1. A surveillance camera comprising a base mounted on a wall, an imaging lens mounted on the base via an imaging lens support member and a switchable mounting unit, and a rotation drive device driving the imagining lens so as to rotate in a panning direction,
   wherein the switchable mounting unit selects either one of a first posture wherein a seating mount of the base, making contact with the wall, is perpendicular to an axis of panning rotation of the imaging lens and a second posture wherein the seating mount is parallel to the axis of panning rotation, and mounts the imaging lens support member on the base, and
   wherein the switchable mounting unit comprises a first positioning plate mounted on the side of the base, a second positioning plate mounted on the side of the imaging lens, and a locking unit securing the positioning plates in a condition of mutual contact,
   the positioning plates have a mutually perpendicular first contact surface and second contact surface,
   the first contact surfaces of the positioning plates make mutual contact and the second contact surfaces of the positioning plates make mutual contact in the first posture,
   the first contact surface of the first positioning plate makes contact with the second contact surface of the second positioning plate and the second contact surface of the first positioning plate makes contact with the first contact surface of the second positioning plate in the second posture, and
   the imaging lens support member can be mounted on the base with one of the two postures selected.

2. The surveillance camera of claim 1,
   wherein the locking unit comprises a claw having a curved tip and projecting from one of the mutually contacting surfaces of the first positioning plate and the second positioning plate, a hole in the other of the mutually contacting surfaces wherethrough the claw may pass, and an elastic member provided on the side of the positioning plate having the hole, with an end portion thereof secured to the positioning plate, and another end portion thereof exerting an elastic force when pressed;
   the second positioning plate is in a secured state with respect to the first positioning plate when the other end portion of the elastic member is fitted between the positioning plate and the claw passing through the hole; and
   the secured state is released when the other end portion of the elastic member is pressed in a direction of removal from the claw.

3. The surveillance camera of claim 2, wherein the positioning plate opposing the positioning plate having the hole is provided with a main claw and an auxiliary claw having mutually different orientations and fitting into the hole as a common hole in both the first posture and the second posture, and the main claw and the auxiliary claw can engage with the elastic member.

* * * * *